(12) United States Patent
Deuber (10) Patent No.: US 9,713,400 B2
(45) Date of Patent: Jul. 25, 2017

(54) METHOD FOR PREPARING A BREWED PRODUCT

(71) Applicant: LUNA TECHNOLOGY SYSTEMS LTS GMBH, Wallisellen (CH)

(72) Inventor: Louis Deuber, Richterswil (CH)

(73) Assignee: QBO COFFEE GMBH, Wallisellen (CH)

( * ) Notice: Subject to any disclaimer, the term of this patent is extended or adjusted under 35 U.S.C. 154(b) by 316 days.

(21) Appl. No.: 14/390,247

(22) PCT Filed: Apr. 3, 2013

(86) PCT No.: PCT/CH2013/000057
§ 371 (c)(1),
(2) Date: Oct. 2, 2014

(87) PCT Pub. No.: WO2013/149354
PCT Pub. Date: Oct. 10, 2013

(65) Prior Publication Data
US 2015/0056351 A1    Feb. 26, 2015

(30) Foreign Application Priority Data

Apr. 5, 2012 (EP) .................................... 12405034

(51) Int. Cl.
*A23F 5/26* (2006.01)
*A47J 31/40* (2006.01)
(Continued)

(52) U.S. Cl.
CPC ............ *A47J 31/407* (2013.01); *A23F 5/262* (2013.01); *A47J 31/3633* (2013.01); *B65D 85/8043* (2013.01)

(58) Field of Classification Search
CPC ..... A47J 31/407; A47J 31/3633; A23F 5/262; B65D 85/8043
See application file for complete search history.

(56) References Cited

U.S. PATENT DOCUMENTS 7,946,217 B2     5/2011  Favre
2009/0117249 A1*  5/2009  Ozanne ............... A47J 31/3628
                                                    426/590
(Continued)

FOREIGN PATENT DOCUMENTS

EP       1 721 553       11/2006
WO      2007/135135      11/2007
(Continued)

*Primary Examiner* — Anthony Weier
(74) *Attorney, Agent, or Firm* — Rankin, Hill & Clark LLP (57) ABSTRACT

The invention relates to a brewing method including providing a capsule into a brewing module with a brewing liquid injector and a brewed product discharging device, said capsule having a covering surfaces on an extraction side and an injection side, said injector having at least one perforation element for each of the injection and extraction sides; closing a brewing chamber of the brewing module so that the at least one perforation element pierces the injection-side covering surface along a cutting line; introducing under pressure a brewing liquid into the region between the injection-side supporting surface and the injection-side covering surface in such a manner that the pressure of the liquid causes the extraction-side covering surface to be displaced towards the interior of the capsule wherein brewing liquid then enters the capsule; and maintaining said pressure until the brewed product emerges from discharge openings produced in the extraction-side covering surface.

8 Claims, 3 Drawing Sheets

(51) Int. Cl.
    *A47J 31/36*    (2006.01)
    *B65D 85/804*   (2006.01)

(56)           References Cited

U.S. PATENT DOCUMENTS

| 2009/0199518 | A1* | 8/2009  | Deuber    | A47J 31/3628 |
|              |     |         |           | 53/492       |
| 2010/0037779 | A1* | 2/2010  | Pecci     | A47J 31/3633 |
|              |     |         |           | 99/289 R     |
| 2010/0101428 | A1* | 4/2010  | Fin       | A47J 31/3638 |
|              |     |         |           | 99/295       |
| 2010/0206177 | A1* | 8/2010  | Ricotti   | A47J 31/0673 |
|              |     |         |           | 99/295       |
| 2010/0269705 | A1* | 10/2010 | Zonelli   | A47J 31/0673 |
|              |     |         |           | 99/295       |
| 2011/0011271 | A1* | 1/2011  | Kollep    | A47J 31/3633 |
|              |     |         |           | 99/287       |
| 2011/0162530 | A1* | 7/2011  | Castellani| A47J 31/3638 |
|              |     |         |           | 99/279       |
| 2011/0200725 | A1  | 8/2011  | Kollep et al. |          |
| 2012/0090473 | A1  | 4/2012  | Deuber    |              |

FOREIGN PATENT DOCUMENTS

| WO | 2009/090201 | 7/2009  |
| WO | 2010/118544 | 10/2010 |
| WO | 2010/118545 | 10/2010 |

* cited by examiner

METHOD FOR PREPARING A BREWED PRODUCT

BACKGROUND OF THE INVENTION

Field of the Invention

The invention relates to the preparation of drinks or likewise, from an extraction material, such as ground coffee, which is contained in a capsule. The invention further relates to a brewing method as well as to a preparation system for a brewed product.

Description of Related Art

Extraction apparatus for preparing drinks from an extraction material present in a portion package are known, for example, as coffee machines or espresso machines and, as was hitherto the case, are enjoying increasing popularity. In many corresponding systems, the portion packages are designed as capsules, in which the extraction material is closed off, for example, in an airtight manner. The capsule is pierced at two opposite sides, for the extraction. A brewing fluid—generally hot water—is introduced at the first side. The brewed product is discharged from the capsule at the second side. Thereby, a considerable pressure for example of 5-20 bar must prevail in the inside of the capsule, depending on the drink to be prepared and the system.

In particular, aluminium and plastics, for example polypropylene have become known as capsule materials. Aluminium capsules provide a very good durability (aroma protection) of the extraction material but are very energy-costly in manufacture. Polypropylene capsules are advantageous with regard to the energy expense and disposal, but impose increased demands on the piercing mechanism and the aroma protection.

Capsules with integrated filter means as well as capsules that merely comprise an envelope enclosing the extraction material are obtainable on the market, and the piercing mechanism must thus be designed for these such that extraction material is not undesirably discharged from the capsule together with the extraction product.

A coffee portion capsule, which approximately has a cube shape, and, in contrast to the known beaker-like capsules, has no peripheral collar on the plane of the one (upper-side) cover surface is known from WO 2010/118543. Such a peripheral collar is required with capsule systems according to the state of the art, firstly in order to guide the capsule on insertion into the coffee machine and to hold it in an intermediate position after the insertion. Secondly, such a collar is necessary for closing the capsule by way of ultrasound welding or thermal sealing by way of a flat lid (which can also be designed as a foil). The collar is required on closure by way of ultrasound welding, in order to accommodate an energy director. If the capsule is closed by way of thermal sealing, the collar is necessary so that the lid rests on a sufficiently large surface. In contrast to this, an arched lid is used according to WO 2010/118543, and the closure is effected by way of ultrasound cut'n'seal. The capsule manufactured according to the teaching of WO 2010/118543 accordingly, independently of its ("cube") shape, instead of a collar has a welding bead which is peripheral between the planes defined by the cover surface, and whose extension/lateral projection is significantly reduced in comparison to known collars and represents an only insignificant departure from the corporal—for example cube-like—shape of the capsule.

Moreover, devices for discharging a brewed product from a portion capsule as well as for introducing a brewing fluid into a portion capsule are known from WO 2010/118544. These devices comprise perforation elements that project away from a support surface. The injection or discharge is effected past these perforation elements, and not through the perforation elements. Moreover, retaining webs can be assigned to the perforation elements, and these webs do not have a cutting edge preventing a bearing of a wall of the capsule on the support surface in an environment of the retaining web by way of the wall of the capsule bearing on the corner.

For a qualitatively good brewed drink, it is often important for the extraction material to be compact during the brewing process and not to swirl. The problem of the extraction material in the capsule not being able to be infinitely compacted, however, also exists due to reasons of manufacturing technology and/or due to a predefined capsule dimensioning and filling quantity.

It is suggested in WO 2008/015642 to compress the extraction material into a tablet in a capsule on filling and to subsequently close the capsule under vacuum conditions, so that the capsule lid after the closure is pressed onto the surface of the capsule and sticks there. The disadvantage with this solution is the fact that the extraction material can loosen again during transport and the tablet has no stability in the inside of the capsule, despite the vacuum prevailing in the capsule interior.

A system is moreover known from WO 2010/118545, with which the capsule is compressed during the brewing procedure by way of laterally engaging pressing bolts. This solution which, per se, functions quite well however has the disadvantages that it requires additional mechanical parts, and that the bolts engaging from the outside into the brewing chamber are difficult to accommodate for geometric reasons, depending on the design of the brewing chamber.

SUMMARY OF THE INVENTION

Accordingly, it is an object of the invention to provide solutions to the problems which have been discussed above. These in particular should permit a brewing procedure under compression conditions, and specifically also in situations, in which the capsule cannot be completely filled with compacted extraction material or cannot be completely filled for other reasons.

This object is achieved by the invention as is defined in the patent claims appended hereto.

According to one aspect, the invention relates to a brewing method, with which a brewed product (in particular a hot drink) is produced in an extraction process from a brewing fluid (in particular hot water) introduced into a capsule, with the following steps:

providing the capsule as a closed capsule with an capsule wall that includes an extraction-side cover surface, an injection-side cover surface and a peripheral lateral surface extending between the extraction-side cover surface and the injection-side cover surface, as well as with an extraction material that is surrounded by the capsule wall and is in the inside of the capsule;

bringing the capsule into a brewing module of a machine for preparing the brewed product, said brewing module comprising an injector for introducing a brewing fluid into the capsule and a discharge device for discharging a brewed product, wherein the injector comprises at least one injection-side perforation element that projects away from an injection-side support surface, and the discharge device comprises at least one extraction-side perforation element that projects away from an extraction-side support surface, closing a brewing chamber of the brewing module so far, until the capsule is located in the brewing chamber, the peripheral lateral surface of the capsule at the injection side is encompassed by a capsule seal, and the at least one injection-side perforation element pierces the injection side cover surface along a (for example two-dimensional) cutting line, for example, such that at least one injection-side tab of the injection-side cover surface arises, introducing a brewing fluid into the region between the injection-side support surface and the injection-side cover surface of the capsule, under pressure, so that due to the fluid pressure, the injection-side cover surface is pressed to the capsule interior and at least partly displaces to the capsule interior, whereas the encompassing capsule seal holds the peripheral lateral surface, and so that brewing fluid gets past at least one injection-side portion of the capsule wall that is pressed into the capsule interior—as the case may be the tab for example—into the capsule interior, and maintaining the pressure on the brewing fluid at least until the brewed product exits out of the discharge openings which are produced in the extraction-side cover surface by way of piercing by the at least one extraction-side perforation element.

The displacement of the injection-side cover surface under pressure can, for example, be a parallel displacement of a central portion of the injection-side cover surface, or an arching of the injection-side cover side towards the capsule interior. Mixed forms with arching regions and ones remaining plane and displaced parallel are also possible.

A two-dimensional cutting line arises if the perforation element is neither perforated only in a point-like manner (i.e., in the manner of a thin needle), nor merely a single, straight (one-dimensional) cutting line, but if the projection of the perforation element onto the support surface (and thus also onto the cutting line) spans a surface and the perforation element has a bent or angled shape or is constructed of several part-pieces that are at an angle to one another. In particular, the perforation element can include a plane element that projects, for example, roughly perpendicularly from the support surface. The plane element, in particular, is a sheet or sheet-metal piece (wherein the term sheet piece represents no limitation of the material selection and also includes correspondingly formed plane elements of plastic), which is curved, creased (e.g. canted) or is composed of several sheet pieces which are at an angle to one another. A one-dimensional cutting line in combination with a retaining web that is at an angle to this and that effects a fish-mouth-like opening of the capsule wall cut by the cutting line can also be used alternatively to the two-dimensional cutting line.

The invention accordingly, amongst other things is based on the concept of using the brewing fluid itself for compressing the capsule, while the capsule is held by an elastic means, specifically the encompassing capsule seal. This concept, among others, utilises the fact that possibilities for the plastic deformation of the capsule with capsules with plastic walls also depend on the temperature, and the brewing fluid with brewing processes is generally introduced into the capsule in a hot manner (at least 80° C. or at least 90° C., for example up to the boiling point (100° C. at sea level) or up to 95° C.). The capsule after a plastic deformation also remains in the compressed condition when the pressure between the capsule outer side (injection-side) and the capsule interior has essentially been compensated. Therefore, the method acts particularly favourably in combination with capsules whose wall has a glass transition temperature of only slightly below room temperature or even above it, by which means the step from room temperature to brewing temperature carries particular weight and greatly influences the plastic deformability. In particular, the glass transition temperature of the capsule is between −50° C. and 50° C., in particular between −30° C. and 20° C. and especially between −20° C. and 5° C.

The wall thickness of a plastic capsule wall can for example be between 0.2 mm and 0.4 mm, in particular between 0.25 mm and 0.35 mm, which permits the use of deep-drawn capsules. Polypropylene, for example, is considered as a material, but also other plastics—in particular but not exclusively—with glass transition temperatures in the above specified range.

An application for other materials, including non-plastics, however, is not ruled out.

The perforation elements generally are free from passages running essentially axially through the perforation elements (axial here indicates the direction perpendicular to the support surface). These perforation elements serve merely for the perforation of the capsule. The injection of the fluids into and the discharge from the capsule are effected past the perforation elements, which is explained in yet more detail hereinafter. The perforation elements themselves therefore can be relatively simple, non-slotted and compact, opening-free elements, and for example be designed in a sheet-like manner (metallic or from plastic).

It is particularly favourable if at least the extraction-side and, for example, also the injection-side elements each comprise a non-cutting retaining web whose axial extension is smaller than the axial extension of a cutting and/or perforating portion of the respective perforation element. On perforating, the cutting portion will therefore firstly form a two-dimensional cutting line (i.e., not representing only one line), which, however, at the same time is closed again by the cutting portion (for example elements designed in a sheet-like manner). With the further penetration of the perforation elements into the capsule interior, a material tab is lifted by way of the corresponding retaining webs, so that an opening for the fluid is formed.

The brewing module and the capsule can be dimensioned such that the distance between the injection-side cover surface and the extraction-side cover surface of the capsule corresponds roughly to the distance between the injection-side and the extraction-side support surface, given a closed brewing chamber or is smaller than this, so that—for example, among other things on account of the elastic capsule deformation on abutment of the perforation elements due to the resistance which the plastic material counters the cutting of the perforation elements—the cover surfaces do not both bear on the support surfaces before the introduction of the brewing fluid. Thus, an intermediate space between the respective support surface and the corresponding cover surface of the capsule remains on the injection side and/or extraction side, even with a closed brewing chamber. The perforation elements then also do not penetrate into the capsule completely up to the abutment.

In particular, the piercing can be effected such that an injection-side tab of the cover surface can be pressed into the inside of the capsule (for example, if present, by way of a corresponding retaining web and/or by way of the pressure of the brewing fluid which acts from the outside) but such that the capsule at least with its extraction-side cover surface does not completely bear on the extraction-side contact surface, i.e. it is distanced to this, and the distance corresponds for example to between 30% and 100% of the height of the extraction-side perforation elements.

The method can then be carried out such that due to the introduction of the brewing fluid, a pressure is built up in the inside of the capsule for so long, until the extraction-side cover surface is displaced to the extraction-side support surface on account of the inner pressure built up in the capsule, wherein discharge openings are produced in the capsule or are enlarged due to the extraction-side perforation elements, through which openings the brewed product can discharged from the capsule.

However, with this variant of the method according to the invention, a piercing can optionally also effected on the extraction side already with the step of the closure of the brewing chamber. In particular, the extraction-side perforation elements can project so far into the capsule, that slot-like piercing openings arise, which however can be closed by the perforation elements themselves, so that it is very difficult for the brewed product to run out through these piercing openings. After the build-up of the inner pressure, the extraction-side cover surface, for example, is pressed so far against the perforation elements that retaining webs of the perforation elements in each case press an extraction-side tab of the extraction-side cover surface into the capsule interior, so that discharge openings arise.

The procedure according to this embodiment accordingly improves the possibilities of building up a large inner pressure in the inside of the capsule. This results in a pre-brewing process in the compacted coffee powder. A pre-brewing process, for example, is known from fully automatic coffee machines with a grinder, and there is deliberately strived for, by way of the ground coffee firstly being compressed with mechanical means, whereupon brewing fluid is introduced until the compressed coffee powder is impregnated, whereupon the supply of brewing fluid is stopped for a while (fraction of a second to a few seconds) and only then does the actual brewing procedure set in. While it is not ruled out with the procedure according to the invention, to interrupt the feed of the brewing fluid in a targeted manner by way of a suitable control, such is not even necessary at all for the pre-brewing process due to the measures according to the invention.

The (injection-side) capsule seal is generally manufactured from a flexible, elastically deformable, in particular rubber-elastic and/or elastomeric material. For example, it can encompass the capsule along the peripheral lateral surface and thereby be pressed against the capsule wall due to its elasticity, in a manner such that the capsule is held by the capsule seal.

In particular, the capsule seal is advantageously dimensioned and matched to the capsule in a manner such that a peripheral seal feature (in particular a seal lip or a seal bead) projects so far radially inwards, that the peripheral lateral surface is locally deformed and is displaced inwards along the seal feature, on closure of the brewing chamber. In other words, not only does a pressing (exerting of a force) against the wall take place on account of the elasticity of the seal, but the seal feature projects so far inwards that a deformation of the capsule also takes place—features corresponding to the seal feature at least temporarily are recessed on the capsule wall—for example a groove corresponding to a seal lip/a seal bead or with several such features a corresponding plurality of grooves.

The brewing temperature, capsule wall material and dimensioning can be matched to one another such that the deformation is plastic and remains during and after the brewing process, which can have a particularly stabilizing effect, as mentioned hereinafter.

The radial deformation, which is effected by the capsule seal, can moreover entail an additional slight compacting of the capsule filling, which can likewise be favorable.

It can be particularly favourable if the injection-side capsule seal includes a plurality of peripheral seal lips and/or seal beads that, on account of their elasticity, press the capsule wall against the capsule interior, wherein a recess is arranged in each case between two consecutive seal lips or seal beads, in a manner such that a peripheral cavity is formed in the operating condition between the consecutive seal lips or seal beads and the capsule.

If the material characteristics of the capsule—for example by way of the selection of a material with a glass transition temperature selected as discussed above, of a brewing pressure of between 8 and 20 bar and of a temperature of between 80° C. and the boiling point of water—are matched to the brewing pressure and brewing temperature such that a plastic deformation of the capsule is possible, then that can also be utilised for a fixed holding of the capsule during the brewing process and thereafter until the ejection. Specifically, no arching between seal lips or seal beads into the peripheral cavities results on account of the inner pressure, and this acts in a stabilising manner against an axial slipping-out of the capsule.

Capsule seals can also be present on both sides, i.e. apart from on the side of the injector, also on the side of the discharge device. In embodiments, the injector-side sealing collar, however, is more extended and/or the injector-side capsule seal comprises more seal lips than the extraction-side capsule seal. For this reason, generally with these embodiments, the capsule on the injector side is also held with a greater friction force than on the extraction side.

The capsule can have an almost arbitrary shape that is matched to the brewing chamber. The invention is particularly favorable with regard to the capsules without a peripheral collar of the capsule in one of the cover surfaces, as is known from the products that are mostly obtainable on the market. Such a peripheral collar although being possible as was hitherto the case, however is no longer necessary. Capsule shapes without peripheral collar are even particularly preferred. Capsule shapes that are no longer anisotropically stiffened by way of a peripheral collar are also considered as a consequence of this, which permits more degrees of freedom.

The present invention is particularly favorable in the context of a capsule that essentially has the shape of a straight cylinder (in the broadest context, i.e. according to the geometric definition of the term "cylinder', which is not limited to rotation cylinders), i.e. the cover surfaces are essentially plane and roughly equal and the peripheral cover surface is roughly perpendicular to the cover surfaces. This does not exclude an inclination of the lateral surface to the perpendicular to the cover surface for example of maximal 3°, in particular maximal 2° or maximal 1.5°. Likewise not ruled out is the presence of a welding bead, which is peripheral in the region of the lateral surface and which is inherent of the manufacturing technology. The capsule despite this can comprise peripheral edges (e.g. a welding bead), which are inherent of manufacturing technology, project laterally maximally 1.5 mm or 1 mm or less and, for example, are shouldered by an end-surface plane.

A shape of a capsule that is polygonal in cross section perpendicular to the axis, in particular a rectangular shape of the capsule, for example an essentially cube-shaped capsule is preferred for many applications. The advantages of this shape with regard to logistics, as already described elsewhere—indeed surprisingly—are supplemented by an improved stability with the brewing process amid a lateral holding by the elastic seal and a plastic deformation of the injection-side cover surface. The side edges during the compression due to the brewing fluid surprisingly act in a stabilising manner, which could be verified in trials by way of the capsule shape resulting after the brewing process.

The design and arrangement of the perforation elements can be effected in a different manner, wherein an optimisation can be effected for certain configurations by way of the following features, which can be realised independently of one another or in combination:

arranging the injection-side perforation elements close to the guiding portion of the capsule seal, i.e. peripherally with respect to the injection-side cover surface. This acts in a mechanically stabilising manner on piercing, i.e. the capsule material can yield to a less extent and moreover a good impregnation of the extraction material is ensured. In particular, with a rectangular base surface, four injection-side perforation elements can be present, on each corner of the base surface of one;

arranging the extraction-side perforation elements closer to the axis, i.e. in a less peripheral manner, than the injection-side perforation elements. By way of this, one can encourage the extraction-side perforation elements only partially piercing (or even not at all) the capsule before the brewing procedure, and a complete opening of the discharge openings not taking place on the extraction side until with the increasing capsule inner pressure.

dimensioning the injection-side perforation elements in relation to the extraction-side perforation elements, so that the injection-side perforation elements have a greater axial extension (or distance of the tip to the support surface, measured perpendicular to this).

providing a passage for each perforation element, in particular in the region that is spanned by the perforation elements (given a two-dimensional cutting line, the perforation elements in a projection on the support surface span a surface that is described in detail in PCT/CH2010/000098; a tab that can be lifted by way of the retaining web results in this configuration). A retaining web advantageously extends past the passage.

With some embodiments, a height of the injection-side perforation elements of between 110% and 160% of the height of the extraction-side perforation elements has been found to be particularly advantageous. The distance of the injection-side perforation elements to the central axis, for example, corresponds to between 110% and 150% of the distance of the extraction-side perforation element to the central axis.

An optimal height of the injection-side perforation elements is between 6 mm and 10 mm, in particular between 7 mm and 9 mm, with roughly cube-shaped capsules of the size between 25 mm and 30 mm (edge length). If the perforation elements have the shape of two plates (sheets) that are at an angle to one another, then the extension of the plates in the support surface is preferably somewhat smaller than the height, for example between 4 and 7 mm. The height of the extraction-side perforation elements can be between 5 mm and 8 mm and the extension of plates forming the perforation elements can be between 3 mm and 6 mm. The distance of the injection-side perforation elements to the central axis can be between 10 and 17 mm, and the distance from the edge of the injection-side cover surface (i.e. to the plane defined by the peripheral wall surface, measured perpendicularly to the plane) between 3 and 7 mm.

With larger capsules with edge lengths of up to 35 mm or larger, the dimensioning can be the same, or the perforation elements can be selected slightly larger.

The subject matter of the invention is also a preparation system for a brewed product—for example a coffee capsule system with a coffee machine—wherein the machine includes a brewing chamber that is matched to the capsule in the above described manner, for preparing the brewed product.

In embodiments, thereby the brewing chamber in the closed condition completely encloses the capsule, and the injector and discharge device include elements that correspond to one another in an exactly fitting manner and in the closed position together form the brewing chamber. The walls in the axial direction (with respect to the guiding of the brewing fluid and/or to the movement direction of the relative movement of the brewing module parts), for example, form an injector plate with the at least one injection-side perforation tip, and discharge plate with the extraction-side perforation element, which projects from the plate into the brewing chamber. The upper, lower and lateral walls are formed by corresponding wall parts of the injector and of the discharge device, the wall parts abutting one another. The respective wall parts can be sealed to one another in the closed position, for example by way of a peripheral shaped seal. This seal, for example, can comprise a lip seal that is fastened on one of the brewing module parts and on closure of the brewing chamber abuts against a surface of the other brewing module part. A brewing chamber that is closed off in such a manner permits a flushing of the extraction apparatus or of the brewing module without a capsule having to be inserted—which is of a significant advantage to the user. This, however, does not exclude the use of a flushing or rinsing capsule or a placeholder capsule during the rinsing or cleaning procedure—with a brewing chamber which is closed off or not completely closed off.

BRIEF DESCRIPTION OF THE DRAWINGS

Embodiments of the invention are hereinafter described by way of drawings. The same reference numerals indicate the same or analogous elements in the drawings. The drawings are not true to scale and to some extent show elements which partly correspond to one another, having sizes which differ from figure to figure. There are shown in.

DETAILED DESCRIPTION OF THE INVENTION

Figures 1, 2:
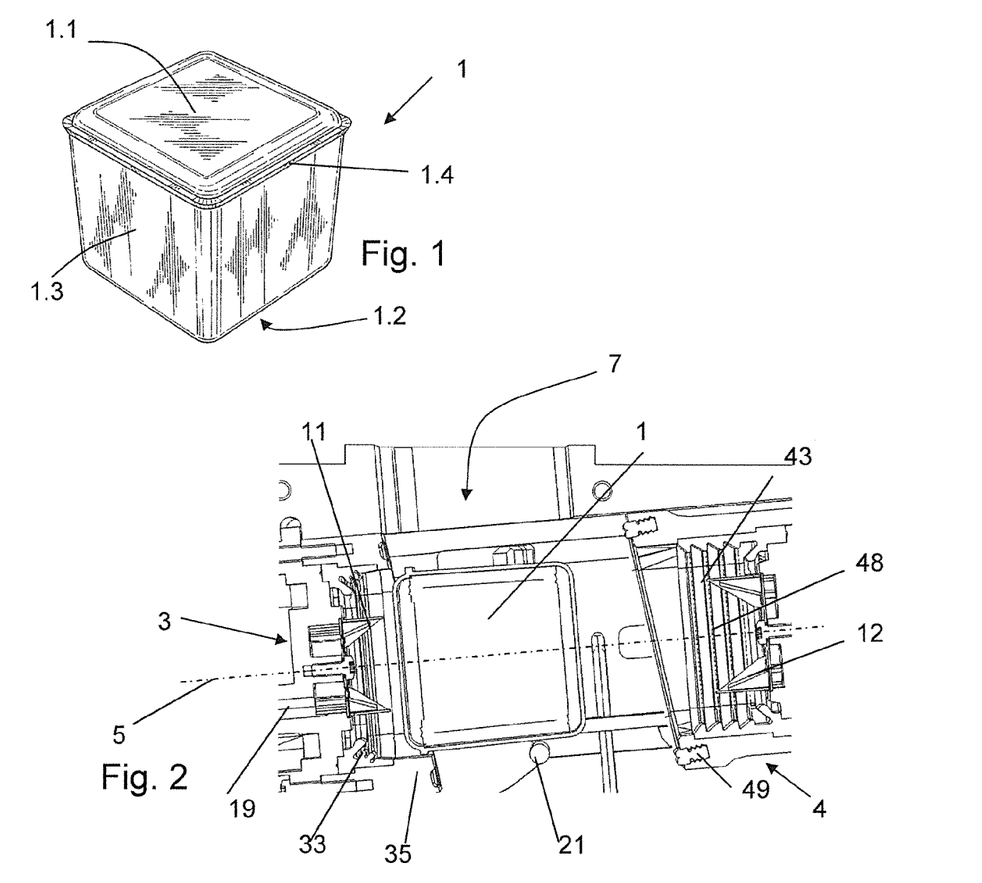
FIG. 1 is a perspective view of a capsule according to the present invention.
FIG. 2 is a detail of a sectioned representation of a brewing module.

The capsule 1 according to FIG. 1 essentially has the shape of a cube with rounded edges, so that the capsule wall defines two cover surfaces 1.1, 1.2 (the one lower-side cover surface in FIG. 1 is not visible due to the orientation selected in the figure), and a peripheral lateral surface 1.3. The side that lies to the top in the figure however is somewhat smaller than the lower side, so that the capsule has a truncated pyramid shape in the strict mathematical sense. The inclination angle of the surfaces that are lateral in the figure, with respect to the perpendicular to the base surface (what is meant of course is that plane perpendicular to the base surface, which runs through the edge between the base surface and the corresponding lateral surface) is very small, and at the most is preferably 2°, for example only approx 1°. Moreover, the height of the capsule above the base surface corresponds approximately to the length of the base surface edges. A welding bead 1.4 is also visible, and projects laterally on all sides by maximally approx d=0.6 mm, thus maximally by approx 2-3% of the cube edge length.

As is known per se, the capsule wall here is manufactured of a suitable plastic material, for example of polypropylene with a wall thickness of 0.1 mm and 0.5 mm, preferably between 0.2 mm and 0.4 mm, for example between 0.25 mm and 0.35 mm Other materials are also conceivable, in particular other foodstuff-compatible plastics. A barrier layer is worked into the capsule wall and has a barrier property for oxygen and prevents a diffusion of oxygen into the capsule. The barrier layer for example comprises ethylene vinyl alcohol copolymer (EVOH). The capsule wall can be composed of a base body and a lid which are manufactured with the deep-drawing method in each case. The closure of the capsule can be effected with the ultrasound cut'n'seal method. One characteristic is also the fact that the welding bead is not in the plane of one of the cover surfaces, but is offset axially thereto.

The wall thickness of the outer wall, for example, is roughly the same on all sides. The outer length of the cube edges for example is between 24 mm and 30 mm, for a filling quantity of between approx. 6 g and approx. 10 g of coffee, or between 30 mm and 35 mm for a filling quantity of between approx. 9 g and approx. 14 g coffee. The capsule can also be designed such that it only consists of the wall and the filling that directly abuts the wall (without filter means or likewise) or it can also be constructed in a more complicated manner, including filter means, liquid guidance means or others, present in the capsule.

The international patent application PCT/CH2010/000097 is also referred to with regard to the capsule outer wall and concerning methods for its manufacture.

As will be explained hereinafter, for the embodiment described here, the brewing module is matched to the welding bead 1.4 such that the orientation of the capsule in the brewing module is defined. Thereby, the cover surface, which is at the upper side in the figure, is the extraction-side cover surface, and the cover surface 1.2, which is at the lower side in the figure, is the injection-side cover surface. The remaining four cube side surfaces together form the peripheral lateral surface 1.3. This terminology is retained hereinafter. The invention can also be implemented if:
- the orientation is selected differently, which is to say the other way round, by way of the upper-side and the lower-side cover surface corresponding to the injection-side and extraction-side cover surface respectively;
- the orientation in the brewing module is not given at all, but the insertion can be effected in any orientation;
- the shape does not have a cube shape but, for example, a cylinder shape or a different shape with two cover surfaces and a lateral surface peripheral therebetween; and/or
- at least one of the cover surfaces (in particular the extraction-side cover surface) is not plane but has a different shape, for example, curving or an arching or likewise.

The configuration described here with an approximately cube shape or other parallelepiped shape and with the arrangement such that a peripheral welding bead 1.4 or another thickening is closer to the extraction-side cover surface than the injection-side cover surface, in a few configurations however is advantageous, in particular since the welding bead 1.4 forms a thickening that mechanically stabilises the capsule on the extraction side.

FIG. 2 in a section representation shows a brewing module that is still open, with an inserted capsule 1. The brewing module includes a discharge device 3 and an injector 4. The discharge device 3 and the injector 4 are displaceable to one another by way of actuating a suitable mechanism—for example with an operating lever. In the shown embodiment, the injector 4 is displaceable in the direction of the discharge device 3, whereas the latter is not movable relative to the outer housing.

In the operating condition, the brewing module serves as a horizontal brewing module of a coffee machine, which apart from the brewing module comprises a water tank, a water heating device (for example flow-type heater) and a pump for feeding brewing water to the injector 4. The capsule 1 can be inserted through an insertion opening 7 in the outer housing, into the brewing chamber. The capsule 1 lies on a rest element 21 as well as a support surface 35 of the discharge device 3 after the insertion, as is shown in FIG. 2. The rest element 21 is displaced away from the position shown in FIG. 2 by way of closing the brewing chamber, and this is described in more detail in the European Patent application 12 405 010.5.

As is evident in FIG. 2, the brewing module is designed such that the axial direction—the axis 5 connecting the injector and the discharge device and along which the movable brewing module part (i.e. here the injector) is moved on opening and closing the brewing chamber—is slightly inclined, for example by approx. 5° with respect to the horizontal, and specifically such that the movable brewing module part (i.e. here the injector) moves slightly downwards when it is moved onto the stationary brewing module part (i.e. here the discharge device).

The injector includes at least one perforation element 12 (in the represented embodiment example four perforation elements) with an assigned feed opening, so that the capsule can be pierced and can be supplied with the brewing fluid through the feed opening. The coffee machine moreover includes, for example, a capsule container, which is arranged below the brewing chamber, into which container the capsule is automatically ejected after the brewing procedure, by way of lifting the operating lever.

Also the discharge device 3 includes a carrier, which defined the support surface, and a plurality of perforation elements 11 projecting away from the support surface, in each case with an assigned passage. The brewed product can flow away via a discharge channel 19.

The injector 4 includes a capsule seal 43 with a sealing collar, which holds the capsule in an encompassing or embracing manner on closure of the brewing chamber. The discharge device 3 is also provided with a capsule seal 33, on which a sealing collar is formed.

The parts of the injector and of the discharge device that form the brewing chamber are matched to one another such that they correspond to one another in an exactly fitting manner and in the close position together form the brewing chamber. The upper, lower and the lateral walls are formed by corresponding walls parts of the first and of the second brewing module part, the wall parts abutting one another. The wall parts that are formed by the injector 4 and the wall parts that are formed by the discharge device 3 are sealed to one another in the closed position by way of a peripheral shaped seal 49. In the closed condition of the brewing chamber, the brewing chamber is additionally sealed to the outside by way of the effect of the capsule seals. This, for example, permits a rinsing process without an inserted capsule.

Figure 3:
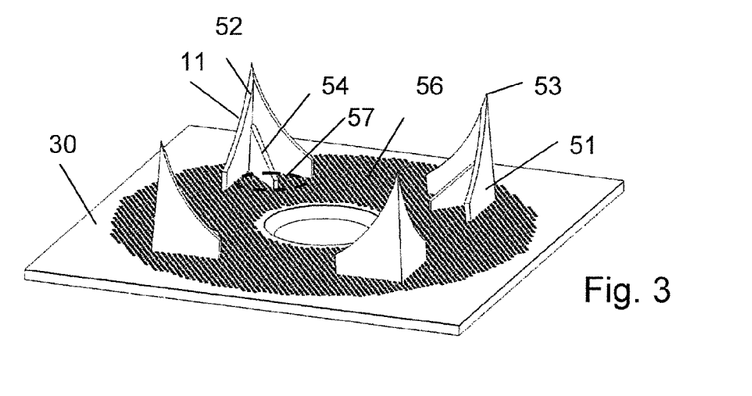
FIG. 3 is a perspective view of a brewing sieve plate with perforation elements.

FIG. 3 shows the extraction-side perforation elements 11 with the carrier 30 in the form of a brewing sieve plate. This brewing sieve plate with perforation elements is described in the publication WO 2010/118544. In FIG. 3, one can see that each perforation element is constructed from two sheet pieces 51 which are at an angle to one another and taper towards a perforation tip 53. The edge projecting away from the carrier is designed as a cutting edge 52 in each case, so that a cutting line forming an angle (therefore two dimensional) arises in the capsule wall after a perforation of the capsule wall by the perforation tip 53 by way of a further pressing of the perforation elements into the capsule. Each perforation element further comprises a retaining web 54 that, in the axial direction, projects less into the capsule that the perforation tip and includes a non-cutting edge. A passage 57 that is represented schematically in a dashed manner only for one perforation element in the figure and over which the retaining webs extends for example, is assigned to each perforation element. The passages are spanned by the micro-sieve foil 56, which as described in WO 2010/118544 have the function of sieve similar to a fully automatic coffee machine. The micro-sieve foil 56 is optional here.

Figure 4:
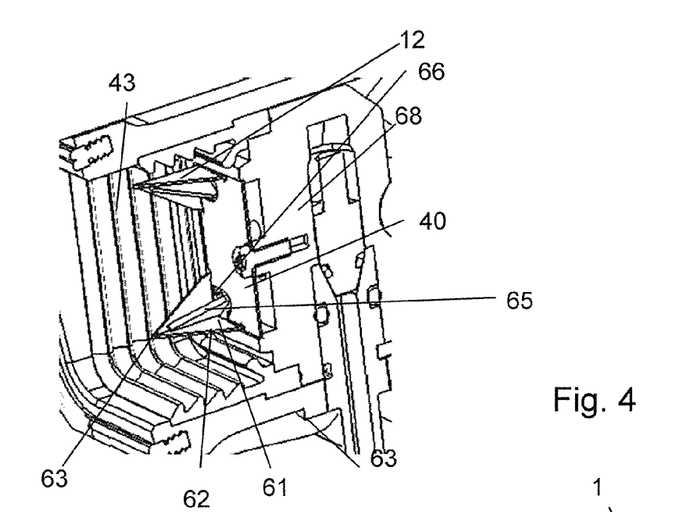
FIG. 4 illustrates an injection-side perforation elements with a carrier.

The injection-side perforation elements 12 with their carrier 40 are represented in FIG. 4. The injection-side perforation elements in each case also includes two sheet pieces 61 with a cutting edge 62, the sheet pieces being at an angle to one another and tapering towards a perforation tip 63. An assigned retaining web 65 is also present. As is also an option for the extraction side, the sheet pieces 61 can be fastened on a carrier plate of the carrier, whereas the retaining webs are formed from a brewing module body 68 holding the carrier plate and project in the axial direction through corresponding openings of the carrier plate, into the brewing chamber. One can clearly see the passages 66 in FIG. 4, wherein these are designed in the region of the carrier plate that is at least partly encompassed by the sheet pieces 61.

Figure 5:
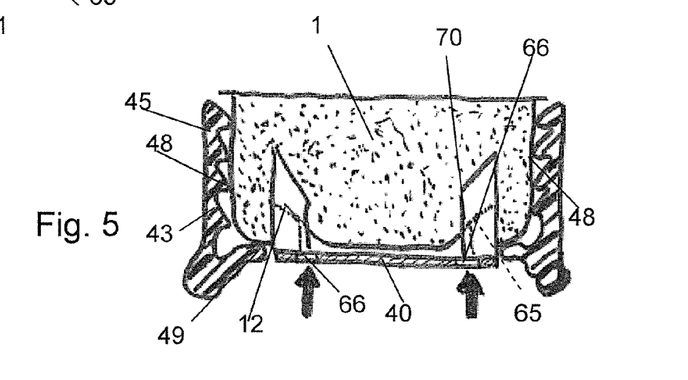
FIG. 5 is a detail with a capsule seal, piercing plate and (partly represented) capsule.

FIG. 5 shows a detail of the construction before the brewing process sets in. The injection-side capsule seal 43, the carrier 40 with the injection-side perforation elements 12 and a part of the capsule are represented after the closure of the brewing chamber. The brewing module body 68 is not represented in FIG. 5. On closure of the brewing chamber, the peripheral collar 45 of the capsule seal engages around or embraces the capsule 1 such that, due to their elasticity, seal lips 48 or seal beads are pressed laterally against the capsule wall. The perforation elements 12 perforate the injection-side cover surface of the capsule and are pressed into this.

The brewing chamber is designed and is matched in its dimensioning to the dimensioning of the coffee capsule such that the injection-side and extraction-side support surfaces do not both bear on the respective cover surfaces of the capsule, given a completely closed brewing chamber before the brewing process sets in (i.e. before the hot water is introduced under pressure). The distance of the support surfaces in the closed condition of the brewing chamber corresponds to the extension of the capsule long the axis 5 (corresponding to the extension top-bottom in FIG. 1) before their insertion into the brewing chamber, i.e. without a force being applied from the outside. The resistance against a penetration of the piercing tips, which is present due to the toughness of the material, effects a slight deformation of the capsule such that at least one of the cover surfaces does not bear on the respective support surface.

In the representation according to FIG. 5, a certain intermediate space between the carrier 40 and the injection-side cover surface of the capsule is visible on the injection side, and such an intermediate space is also formed on the extraction-side, wherein on the extraction-side the capsule for example is pierced only to such an extent that the perforation elements produce only one cutting line but the retaining webs however do not yet project into the inside of the capsule, on account of the dimensioning and/or arrangement.

In the configuration according to FIG. 5, the injection-side perforation elements 12 however have penetrated so far into the capsule, that in each case a tab 70 of the capsule wall material that is produced by the two-dimensional cutting line is pressed into the inside of the capsule due to the effect of the retaining webs 65, whereby this would be effected (not until) by way of the fluid pressure without the retaining webs.

With the brewing process, this hot brewing fluid is introduced under pressure through the passages 66. This is in contrast to the ideas according to the state of the art, with which the brewing fluid is guided through the perforation elements themselves and thus gets into the inside of the capsule in a direct manner. With the idea according to the present aspect of the invention, in contrast firstly a pressure is built up from the outside onto the capsule wall due to the limited flow-through capacity of the openings in the capsule wall, wherein fluid gets into the intermediate space between the carrier 40 and the capsule wall, so that the pressure acts on the capsule wall in a surfaced manner. Simultaneously, the plastic deformability of the capsule wall is increased due to the increased temperature of the brewing fluid (the glass transition temperature of polypropylene lies at approx. 0° C. or slightly below). The capsule wall is additionally pushed inwards by way of this, which compresses and compacts the contents of the capsule, before larger fluid quantities have penetrated into the capsule. This arching is possible due to the stabilising effect of the encompassing capsule seal 43 (or of the encompassing seal collar 45) which holds the peripheral wall in position and in place.

After some time (generally after 1 s up to a few seconds) an excess pressure also builds up in the inside of the capsule on account of the brewing fluid which has penetrated into the capsule in larger quantities, and a compensation of the pressure between the capsule interior and the injector takes place. At this point in time, a pre-brewing process has arisen in the capsule interior, by way of the now compact extraction material, which is protected from swirling, being impregnated with the brewing fluid. For this, the cover surface is pressed slightly outwards and in a surfaced manner against the brewing sieve plate, on the extraction side, due to the larger capsule inner pressure, by which means the capsule wall at the extraction side is pressed to the extraction-side support surface. As a result of this, the extraction-side perforation elements (which, for example, are arranged less peripherally with regard to the axis 5 than the injection-side perforation elements, by which means the arching becomes greater) penetrate further into the capsule, until the tabs produced by the perforation elements by the retaining webs are lifted significantly inwards from the cover surface and thus release a discharge opening, through which the now brewed brewing product flows away out of the capsule.

Figure 6:
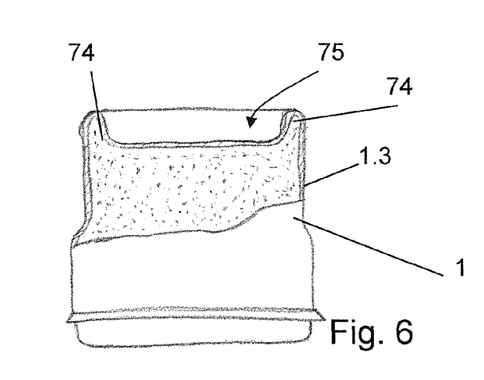
FIG. 6 is a section along the line VI-VI in FIG. 7 through a capsule after the brewing process.
Figure 7:
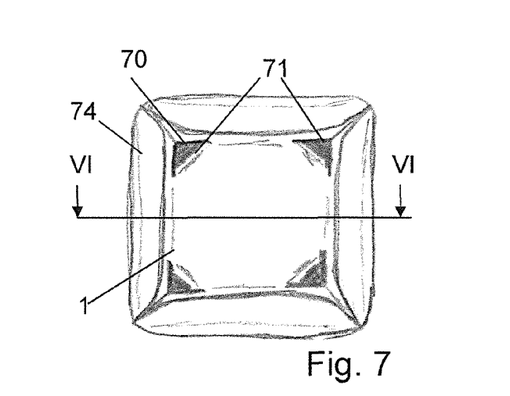
FIG. 7 is a view of the capsule from the injection side, after the brewing process.

FIGS. 6 and 7 in a sectioned representation or in a view from the injection side show the shape of the capsule. One clearly sees the arching or curvature inwards, so that a capsule volume reduced by a compression volume 75 arises. Ribs 74 have arisen in the edge region on account of the effect of the encompassing sealing collar. The injection-side openings 71 in the capsule wall are likewise represented in the figures.

Figure 10:
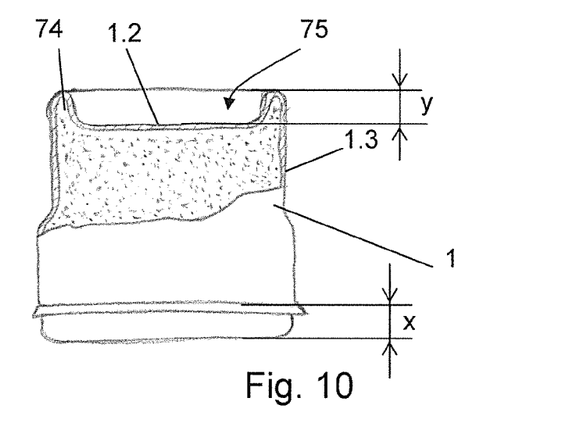
FIG. 10 is a section corresponding to FIG. 6.

The compression volume can thereby roughly correspond to the volume, by which the capsule was not filled on its manufacture. For example, the lid used for the embodiment described here is slightly arched. On filling the capsule, the lid volume, which is defined by the arching of the lid, cannot be filled, even with a complete filling of the beaker (forming the lower cover surface 1.2 and the side walls 1.4) which is closed by the lid, which is why in this case the residual volume—and thus also the compression volume 75—corresponds roughly to this lid volume. As is represented in FIG. 10, one can therefore mostly observe that the displacement of the lower cover surface 1.2 inwards, said displacement indicated with "y" in the figure, corresponds roughly to the magnitude "x" by which the lid is arched.

As one can see particularly well in FIG. 6, the capsule after the brewing process is deformed such that the peripheral lateral surface 1.3 is slightly pressed together on the injection side due to the action of the encompassing seal, whereas on the extraction side is its slightly widened due to the pressure of the capsule interior. On the injection side, the peripheral lateral surface can moreover be slightly ribbed as an imprint of the seal with the several seal lips 48.

Coffee (or likewise) which goes out of the capsule from the discharge opening 3 goes to an exit opening via suitable channels, from where it can flow into the provided cup.

Figures 8, 9:
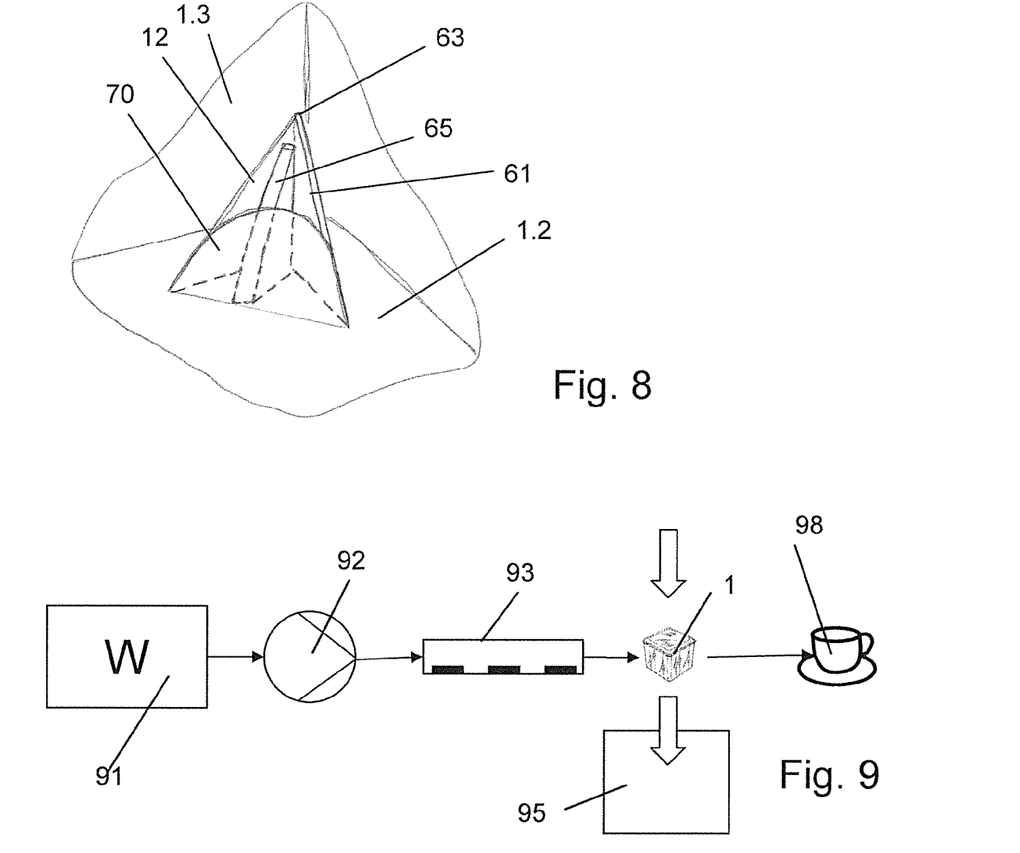
FIG. 8 a view from the inside, onto a pierced capsule wall.
FIG. 9 is a schematic diagram of a coffee machine.

FIG. 8 in a view from the inside (without extraction material) shows the pierced injection-side cover surface 1.2 of the capsule. One can see the tab (70), as is also pressed inwards out of the cover surface plane by way of the effect of the retaining web 65, and thus keeps an opening free between the capsule wall and perforating knives (sheet pieces 61). A similar effect occurs on the extraction side, wherein there the stabilising effect of the encompassing seal is absent.

A coffee machine according to the invention and with a brewing module, as is shown schematically in FIG. 9, apart from the brewing module, includes a water tank 91, a pump 92 for feeding brewing water to the injector 4 and a water heating device 93 (e.g. flow type heater). A capsule container 95 is arranged below the brewing module, in which capsule container the capsules 1 fall or are transported, after the brewing process. The reference numeral 98 indicates a coffee cup.

Finally, it should yet be noted that the application of the procedure according to the invention is not limited to the brewing of coffee. Other brewing drinks, in particular tea or further brewed products can be created with the method described here and/or with the means described here.

The invention claimed is:

1. A brewing method for brewing, a brewed product in an extraction process from a brewing fluid introduced into a capsule, the method comprising the steps of:
   providing a capsule, the capsule comprising:
      capsule walls that include an extraction-side cover surface, an injection-side cover surface and at least one peripheral lateral surface that extends between the extraction-side cover surface and the injection-side cover surface, said capsule walls cooperating to define a capsule interior; and,
      an extraction material received in the capsule interior;
   introducing the capsule into a brewing module of a machine for preparing the brewed product, said brewing module comprising:
      an injector for introducing the brewing fluid into the brewing module, said injector comprising at least one injection-side perforation element that projects away from an injection-side carrier; and
      a discharge device for discharging a brewed product, said discharge device comprises at least one extraction-side perforation element that projects away from an extraction-side carrier;
   while the capsule is in the brewing module, closing a brewing chamber of the brewing module until a portion of the at least one peripheral lateral surface of the capsule is encompassed by a capsule seal, and until the at least one injection-side perforation element pierces the injection-side cover surface so that a cutting line is produced in the injection-side cover surface,
   while the capsule seal holds the at least one peripheral lateral surface, introducing the brewing fluid into a region between the injection-side carrier and the injection-side cover surface under pressure whereby fluid pressure of said brewing fluid presses the injection-side cover surface toward the capsule interior and thereby acts to at least partly displace the injection-side cover surface toward the capsule interior to yield a displaced injection-side cover portion, and brewing fluid received in the region between the injection-side carrier and the displaced injection-side cover portion surface thereafter flowing past the displaced injection-side cover portion into the capsule interior via the cutting line formed in the injection side cover surface, and
   maintaining pressure on the brewing fluid at least until the brewed product exits out of at least one discharge opening, which is produced in the extraction-side cover surface by way of piercing by the at least one extraction-side perforation element.

2. The method according to claim 1, wherein the brewing module and the capsule are dimensioned such that the cover surfaces do not both bear on the support surfaces before the introduction of the brewing fluid.

3. The method according to claim 2, wherein after the introduction of the brewing fluid, the pressure on the brewing fluid is maintained until the extraction-side cover surface is displaced to the extraction-side carrier by way of an inner pressure built up in the capsule, so that discharge openings are produced in the capsule by way of the extraction-side perforation elements, through which discharge openings the brewed product is dischargeable from the capsule.

4. The method according to claim 1, wherein the extraction-side perforation element or the extraction-side perforation elements is/are selected such that each perforation element comprises a non-cutting, extraction-side retaining web that projects away from the extraction-side carrier.

5. The method according to claim 4, wherein the brewing module and the capsule are dimensioned and are matched to one another such that the extraction-side retaining webs essentially do not project into the capsule interior before the introduction of the brewing fluid.

6. The method according to claim 1, wherein the at least one injection-side perforation element has a greater axial extension than the at least one extraction-side perforation element.

7. The method according to claim 1, wherein several injection-side perforation elements and several extraction-side perforation elements are present, wherein the injection-side perforation elements have a greater distance to an axis which is perpendicular to the support surfaces, than the extraction-side perforation elements.

8. The method according to claim 1, wherein a capsule seal of an elastomeric and/or rubber-elastic material is used as the encompassing capsule seal.

* * * * *